(12) United States Patent
Genda

(10) Patent No.: US 12,321,647 B2
(45) Date of Patent: Jun. 3, 2025

(54) INFORMATION PROCESSING APPARATUS CAPABLE OF REDUCING LOAD OF PROVIDING PRINT SETTINGS USER INTERFACE, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Mariko Genda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/368,875

(22) Filed: Sep. 15, 2023

(65) Prior Publication Data

US 2024/0103776 A1  Mar. 28, 2024

(30) Foreign Application Priority Data

Sep. 22, 2022  (JP) .................................. 2022-151346

(51) Int. Cl.
*G06F 3/12* (2006.01)
(52) U.S. Cl.
CPC .......... *G06F 3/1205* (2013.01); *G06F 3/1232* (2013.01); *G06F 3/1253* (2013.01); *G06F 3/1285* (2013.01)
(58) Field of Classification Search
CPC .... G06F 3/1205; G06F 3/1232; G06F 3/1253; G06F 3/1285
See application file for complete search history.

(56) References Cited

U.S. PATENT DOCUMENTS

| 10,481,844 | B2 | 11/2019 | Inoue | |
|---|---|---|---|---|
| 2011/0063645 | A1* | 3/2011 | Sugino | G06F 3/1232 358/1.13 |
| 2013/0235402 | A1* | 9/2013 | Yamamichi | G06F 3/1224 358/1.13 |
| 2017/0017447 | A1* | 1/2017 | Saigusa | G06F 3/1285 |
| 2017/0060488 | A1* | 3/2017 | Oya | G06F 3/1209 |
| 2018/0067704 | A1* | 3/2018 | Kobayashi | G06F 3/1232 |
| 2018/0081598 | A1* | 3/2018 | Suzuki | G06F 3/1225 |
| 2018/0217788 | A1* | 8/2018 | Nakagawa | G06F 9/4411 |
| 2018/0275931 | A1* | 9/2018 | Saigusa | G06F 3/1284 |
| 2018/0314475 | A1* | 11/2018 | Nishio | G06F 3/122 |
| 2019/0114119 | A1* | 4/2019 | Kawasaki | H04N 1/00472 |
| 2020/0110559 | A1* | 4/2020 | Natori | G06F 3/1205 |

FOREIGN PATENT DOCUMENTS

JP  2019-074884 A  5/2019

\* cited by examiner

*Primary Examiner* — Nicholas Pachol
(74) *Attorney, Agent, or Firm* — VENABLE LLP

(57) ABSTRACT

A non-transitory computer-readable storage medium stores a program for causing a computer to execute a method of controlling an information processing apparatus. The method includes displaying, in a case where predetermined information is not received from an application program for generating image data, a first print setting screen including at least a first setting item, and displaying, in a case where the predetermined information is received from the application program, a second print setting screen including at least the first setting item and a second setting item, the second setting item being not included in the first print setting screen.

9 Claims, 19 Drawing Sheets

FIG. 3

```
<?xml version="1.0" encoding="UTF-8"?>
<psf:PrintTicket  · · ·  version="1">
    :
  <psf:Feature name="psk:PageMediaType">
    <psf:Option name="psk:Plain"/>
  </psf:Feature>
    :
</psf:PrintTicket>
```

```xml
<?xml version="1.0" encoding="UTF-8"?>
<psf:PrintCapabilities   · · ·   version="1">
  :
  <psf:Feature name="psk:PageMediaType">
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">Media Type</psf:Value>
    </psf:Property>
    <psf:Option name="psk:Plain">
      <psf:Property name="psk:DisplayName">
        <psf:Value xsi:type="xsd:string">Plain Paper</psf:Value>
      </psf:Property>
    </psf:Option>
    <psf:Option name="psk:PhotoPaper">
      <psf:Property name="psk:DisplayName">
        <psf:Value xsi:type="xsd:string">Photo Paper</psf:Value>
      </psf:Property>
    </psf:Option>
  </psf:Feature>
  :
</psf:PrintCapabilities>
```

FIG. 7

```
<?xml version="1.0" encoding="UTF-8"?>                          701
<psf:PrintTicket  · · ·  version="1">
      :
  <psf:Feature name="psk:PageMediaType">
    <psf:Option name="psk:Plain"/>
  </psf:Feature>
      :
  <psf:Property name="ns0000:AdvancedMode">   702
    <psf:Value xsi:type="xsd:string">All</psf:Value>
  </psf:Property>
</psf:PrintTicket>
```

FIG. 10

```xml
<?xml version="1.0" encoding="UTF-8"?>
<psf:PrintCapabilities  · · ·  version="1">
    :
  <psf:Feature name="psk:PageMediaType">   ⟵1002
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">Media Type</psf:Value>
    </psf:Property>                              ⟵1003
    <psf:Option name="psk:Plain" constrained="psk:None">
      <psf:Property name="psk:DisplayName">   ⟵1004
        <psf:Value xsi:type="xsd:string">Plain Paper</psf:Value>
      </psf:Property>                      ⟵1005
      <psf:ScoredProperty name="ns0000:DuplexPrinting">
        <psf:Value xsi:type="xsd:string">Supported</psf:Value>
      </psf:ScoredProperty>
        :
    </psf:Option>
    <psf:Option name="psk:PhotoPaper" constrained="psk:None">
      <psf:Property name="psk:DisplayName">
        <psf:Value xsi:type="xsd:string">Photo Paper</psf:Value>
      </psf:Property>
      <psf:ScoredProperty name="ns0000:DuplexPrinting">
        <psf:Value xsi:type="xsd:string">None</psf:Value>
      </psf:ScoredProperty>
        :
    </psf:Option>
  </psf:Feature>                                   ⟵1006
  <psf:Feature name="ns0000:JobBookletStapleSide">
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">Margin for stapling</psf:Value>
    </psf:Property>
    <psf:Option name="ns0000:Left_or_Top" constrained="psk:None">
      <psf:Property name="psk:DisplayName">
        <psf:Value xsi:type="xsd:string">Left</psf:Value>
      </psf:Property>
    </psf:Option>
    <psf:Option name="ns0000:Right_or_Bottom" constrained="psk:None">
      <psf:Property name="psk:DisplayName">
        <psf:Value xsi:type="xsd:string">Right</psf:Value>
      </psf:Property>
    </psf:Option>
  </psf:Feature>
    :
</psf:PrintCapabilities>
```

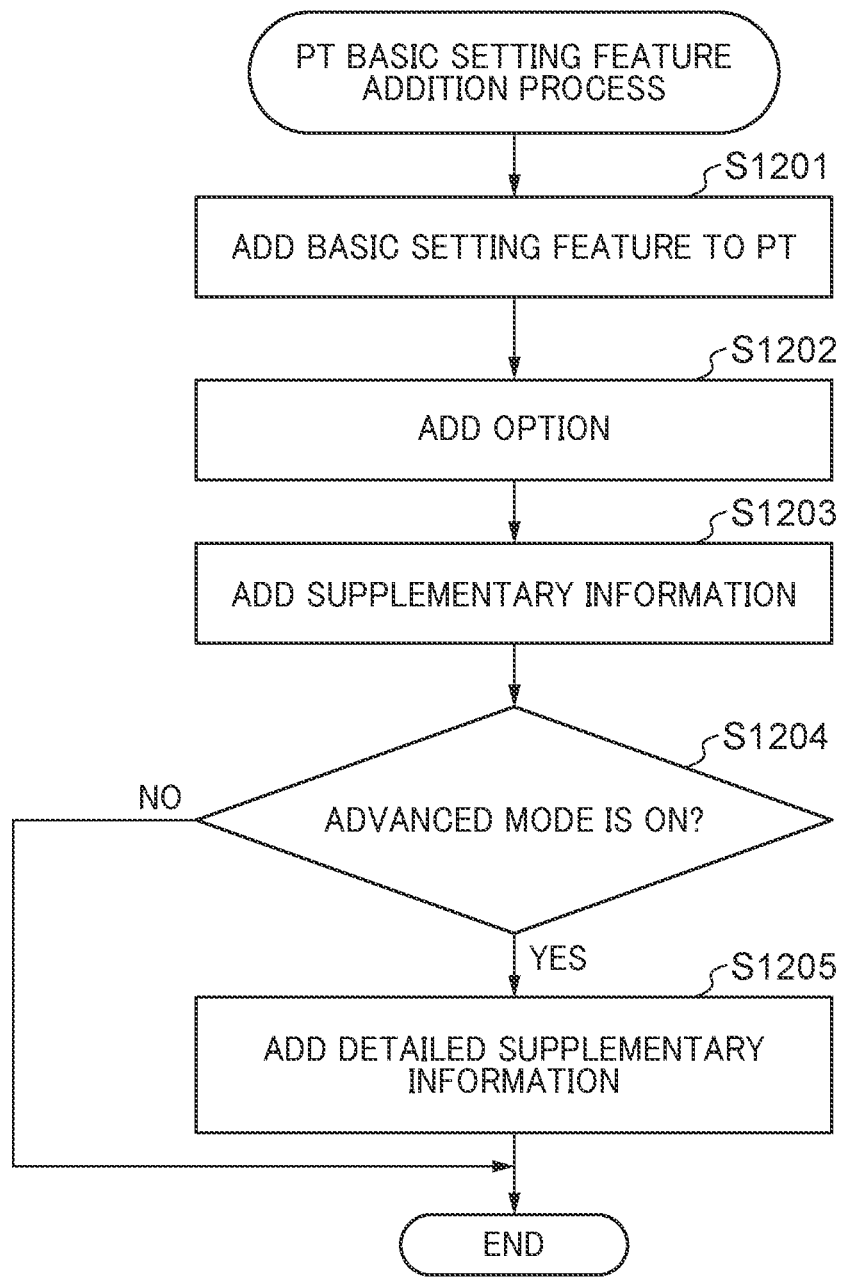

FIG. 13

```
<?xml version="1.0" encoding="UTF-8"?>
<psf:PrintTicket · · · version="1">
    :
  <psf:Feature name="psk:PageMediaType">
    <psf:Option name="psk:Plain"/>
  </psf:Feature>
  <psf:Feature name="ns0000:JobBookletStapleSide">
    <psf:Option name="ns0000:Left_or_Top"/>
  </psf:Feature>
    :
</psf:PrintTicket>
```

1301, 1302 (psf:Feature name="psk:PageMediaType"), 1303 (psf:Feature name="ns0000:JobBookletStapleSide")

FIG. 14

```
                                                             1401
<?xml version="1.0" encoding="UTF-8"?>
<psf:PrintTicket · · · version="1">
        :
  <psf:Feature name="psk:PageMediaType">
    <psf:Option name="psk:Plain"/>
  </psf:Feature>
        :
                                                   1402
  <psf:Property name="ns0000:AdvancedMode">
    <psf:Value xsi:type="xsd:string">Booklet</psf:Value>
  </psf:Property>
</psf:PrintTicket>
```

FIG. 17

```xml
<?xml version="1.0" encoding="UTF-8"?>
<psf:PrintCapabilities · · · version="1">
  :
  <psf:Feature name="psk:PageMediaType">
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">Media Type</psf:Value>
    </psf:Property>
    <psf:Option name="psk:Plain" constrained="psk:None">
      <psf:Property name="psk:DisplayName">
        <psf:Value xsi:type="xsd:string">Plain Paper</psf:Value>
      </psf:Property>
    </psf:Option>
  </psf:Feature>
  <psf:Feature name="ns0000:JobBookletStapleSide">
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">Margin for stapling</psf:Value>
    </psf:Property>
    <psf:Option name="ns0000:Left_or_Top" constrained="psk:None">
      <psf:Property name="psk:DisplayName">
        <psf:Value xsi:type="xsd:string">Left</psf:Value>
      </psf:Property>
    </psf:Option>
    <psf:Option name="ns0000:Right_or_Bottom" constrained="psk:None">
      <psf:Property name="psk:DisplayName">
        <psf:Value xsi:type="xsd:string">Right</psf:Value>
      </psf:Property>
    </psf:Option>
  </psf:Feature>
  :
</psf:PrintCapabilities>
```

*FIG. 18*

```
<?xml version="1.0" encoding="UTF-8"?>
<psf:PrintTicket  · · ·  version="1">
    ⋮
  <psf:Feature name="psk:PageMediaType">
    <psf:Option name="psk:Plain"/>
  </psf:Feature>
    ⋮
  <psf:Property name="ns0000:AdvancedMode">    ⟵ 1802
    <psf:Value xsi:type="xsd:string">All</psf:Value>
  </psf:Property>
  <psf:Property name="ns0000:IsNeedDisplayName">    ⟵ 1803
    <psf:Value xsi:type="xsd:string">No</psf:Value>
  </psf:Property>
</psf:PrintTicket>
```

```xml
<?xml version="1.0" encoding="UTF-8"?>
<psf:PrintCapabilities  ···  version="1">    ~1902
  ··
  <psf:Feature name="psk:PageMediaType">
    <psf:Property name="psf:SelectionType">
      <psf:Value xsi:type="xsd:QName">psk:PickOne</psf:Value>    ~1903
    </psf:Property>
    <psf:Option name="psk:Plain" constrained="psk:None"/>
    <psf:Option name="psk:PhotoPaper" constrained="psk:None"/>
  </psf:Feature>
  <psf:Feature name="ns0000:JobBookletStapleSide">
    <psf:Property name="psf:SelectionType">
      <psf:Value xsi:type="xsd:QName">psk:PickOne</psf:Value>
    </psf:Property>
    <psf:Option name="ns0000:Left_or_Top" constrained="psk:None"/>
    <psf:Option name="ns0000:Right_or_Bottom" constrained="psk:None"/>
  </psf:Feature>
  ··
</psf:PrintCapabilities>
```

1901

INFORMATION PROCESSING APPARATUS CAPABLE OF REDUCING LOAD OF PROVIDING PRINT SETTINGS USER INTERFACE, METHOD OF CONTROLLING INFORMATION PROCESSING APPARATUS, AND STORAGE MEDIUM

BACKGROUND OF THE INVENTION

Field of the Invention

The present invention relates to an information processing apparatus that is capable of reducing the load for providing print settings user interface, a method of controlling the information processing apparatus, and a storage medium.

Description of the Related Art

There is known a printing system in which a user operates an information processing apparatus which has installed Windows (registered trademark) of Microsoft (registered trademark) as an operating system (OS) to cause a printer to execute print processing (see e.g. Japanese Laid-Open Patent Publication (Kokai) No. 2019-74884). An XML Paper Specification (XPS) printer driver equipped in such an information processing apparatus uses a print pass using an XPS document. In this XPS print pass, in determining an appearance of a print, print function information referred to as the Print Capabilities (hereinafter referred to as the "PC") and print settings information referred to as the Print Ticket (hereinafter referred to as the "PT") are used. The PC and the PT are described in XML. For example, in the information processing apparatus, exchange of information between an application for providing print settings user interface and the OS, and the printer driver is performed by using the PC and the PT.

To provide print settings user interface on which settings of a variety of print functions can be made, it is necessary to describe more information related to the print functions which can be set on the information processing apparatus, in the PC and the PT. On the other hand, if the contents described in the PC and the PT are increased, a lot of time is required to generate the PC and the PT, which increases the load of processing related to the provision of the print settings user interface.

SUMMARY OF THE INVENTION

The present invention provides an information processing apparatus that is capable of reducing the load of processing related to the provision of print settings user interface, a method of controlling the information processing apparatus, and a storage medium.

In a first aspect of the present invention, there is provided an information processing apparatus that generates print data to be used for execution of print processing, including a providing unit configured to provide an instruction for displaying a print settings user interface for making settings of print functions used for generation of the print data, and a generation unit configured to generate print function information indicating one or more print functions which can be set on the print settings user interface according to an instruction provided by the providing unit, wherein in a case where predetermined setting information is not included in the instruction, the generation unit generates first print function information including information on the one or more print functions corresponding to the instruction but not including information corresponding to the predetermined setting information, whereas in a case where the predetermined setting information is included in the instruction, the generation unit generates second print function including the information on the one or more print functions corresponding to the instruction and including the information corresponding to the predetermined setting information.

In a second aspect of the present invention, there is provided an information processing apparatus that generates print data to be used for execution of print processing, including a providing unit configured to provide an instruction for displaying a print settings user interface for making settings of print functions used for generation of the print data, and a generation unit configured to generate print settings information including settings of one or more print functions, which are made on the print settings user interface, according to an instruction provided by the providing unit, wherein in a case where predetermined setting information is not included in the instruction, the generation unit generates first print settings information including information on the one or more print functions corresponding to the instruction but not including information corresponding to the predetermined setting information, whereas in a case where the predetermined setting information is included in the instruction, the generation unit generates second print settings information including the information on the one or more print functions corresponding to the instruction and including the information corresponding to the predetermined setting information.

According to the present invention, it is possible to reduce the load of processing related to the provision of the print settings user interface.

Further features of the present invention will become apparent from the following description of exemplary embodiments (with reference to the attached drawings).

BRIEF DESCRIPTION OF THE DRAWINGS

FIG. 3 is a diagram showing an example of PT generated in the host computer shown in FIG. 1.

FIG. 4 is a diagram showing an example of PC generated in the host computer shown in FIG. 1.

FIG. 7 is a diagram showing another example of PT generated in the host computer shown in FIG. 1.

FIG. 10 is a diagram showing another example of PC generated in the host computer shown in FIG. 1.

FIG. 12 is a flowchart of a PT basic setting feature addition process performed in a step in FIG. 11.

FIG. 13 is a diagram showing another example of PT generated in the host computer shown in FIG. 1.

FIG. 14 is a diagram showing another example of PT generated in the host computer shown in FIG. 1.

FIG. 17 is a diagram showing another example of PC generated in the host computer shown in FIG. 1.

FIG. 18 is a diagram showing another example of PT generated in the host computer shown in FIG. 1.

FIG. 19 is a diagram showing another example of PC generated in the host computer shown in FIG. 1.

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential to the solution according to the invention.

Figure 1:
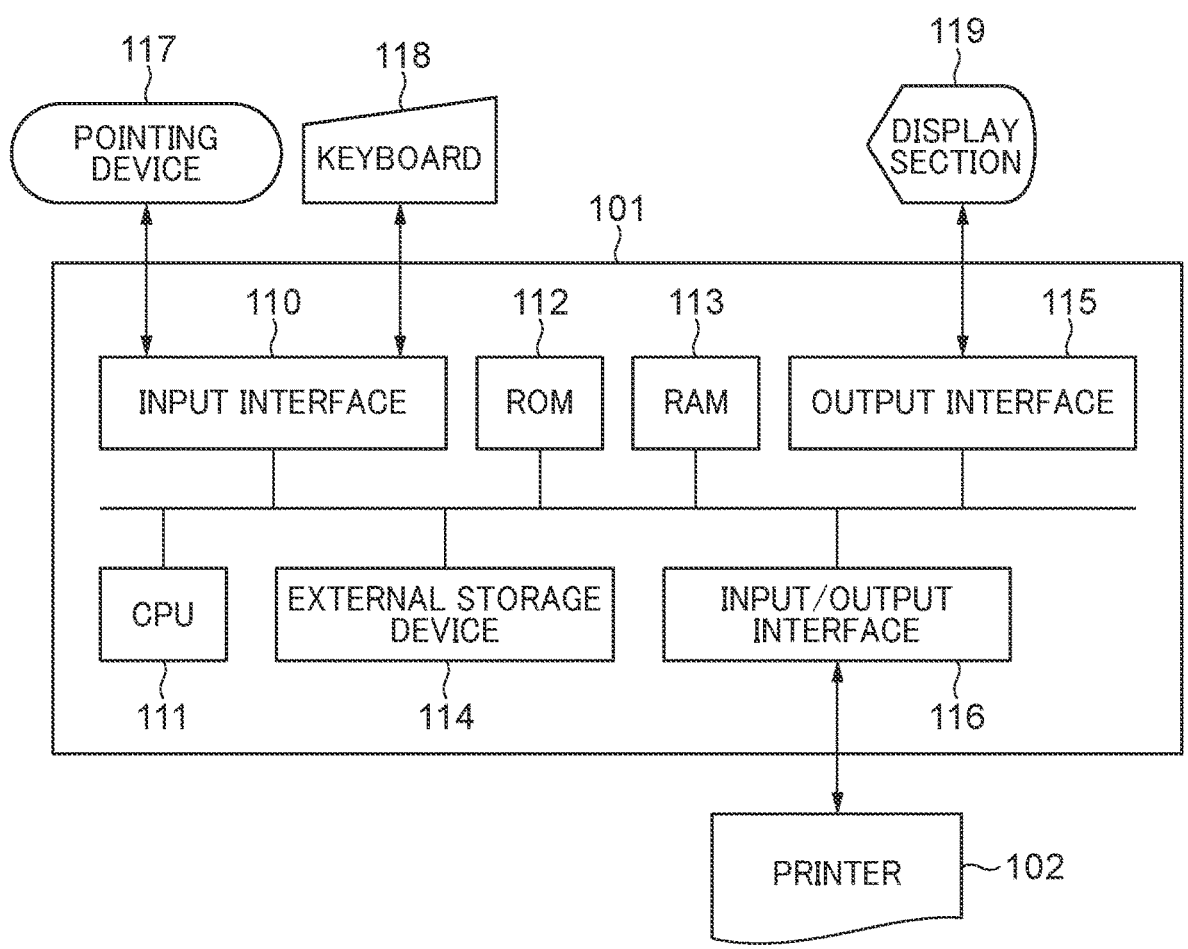
FIG. 1 is a block diagram schematically showing a hardware configuration of a host computer as an information processing apparatus according to an embodiment of the present invention.

FIG. 1 is a block diagram schematically showing a hardware configuration of a host computer 101 as an information processing apparatus according to an embodiment of the present invention. Referring to FIG. 1, the host computer 101 includes an input interface 110, a central processing unit (CPU) 111, a read only memory (ROM) 112, a random access memory (RAM) 113, an external storage device 114, an output interface 115, and an input/output interface 116.

The CPU 111 loads programs stored in the ROM 112 or the external storage device 114 into the RAM 113 and executes the loaded programs. With this, functions, described hereinafter, and processes, described hereinafter, in the host computer 101 are realized. The ROM 112 also stores an initialization program. The external storage device 114 stores the programs, applications, an operating system (OS), a printer driver, and a variety of other data. The RAM 113 is used, when executing a program stored in the ROM 112 or the external storage device 114, as a work memory into which the program is loaded. To the input interface 110, input devices, such as a keyboard 118 and a pointing device 117, are connected. Further, to the output interface 115, a display device, such as a display section 119, is connected. To the input/output interface 116, a printer 102 is connected. The host computer 101 communicates with the printer 102 via the input/output interface 116. The printer 102 performs print processing based on e.g. print data received from the host computer 101. Note that although in the present embodiment, the host computer 101 and the printer 102 are described as separate apparatuses, these may be configured as one information processing apparatus.

Figure 2:
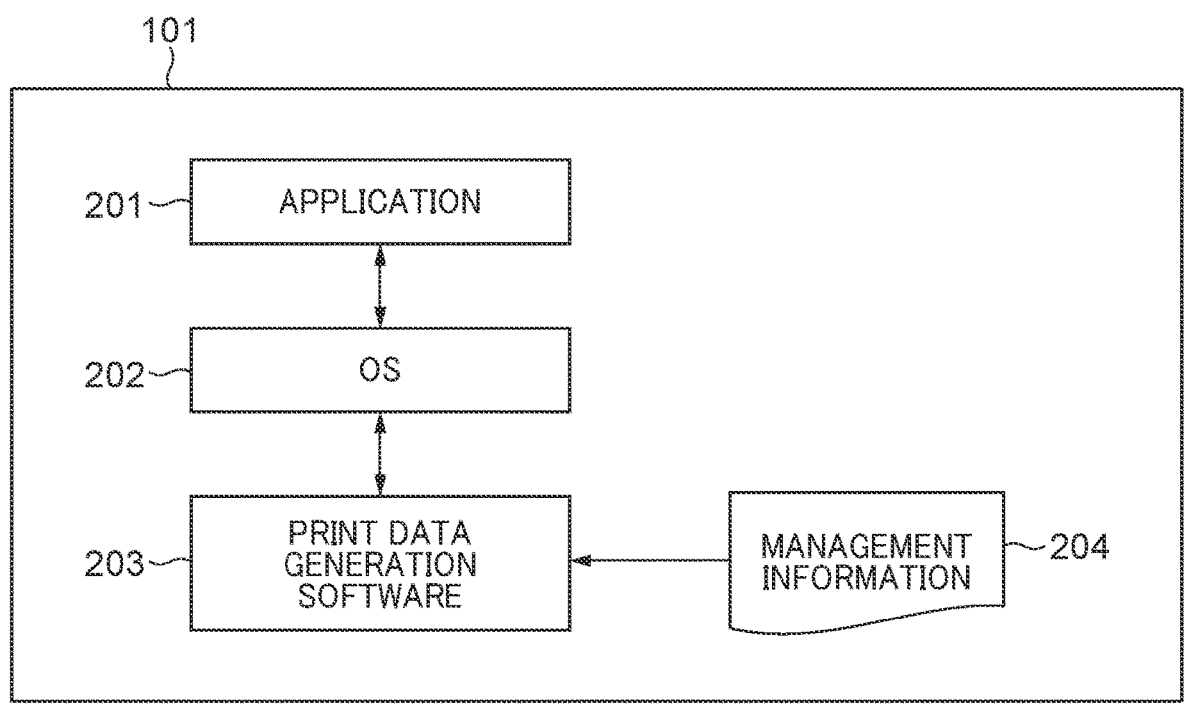
FIG. 2 is a block diagram schematically showing a software configuration of the host computer shown in FIG. 1.

FIG. 2 is a block diagram schematically showing a software configuration of the host computer 101 shown in FIG. 1. Referring to FIG. 2, the host computer 101 is equipped with an application 201, an OS 202, and a print data generation software program 203. Processing operations of these software modules are realized by the CPU 111 that loads the programs stored in the ROM 112 or the external storage device 114 into the RAM 113 and executes the loaded programs.

The application 201 is a software module for generating contents (drawing data) to be printed, and is e.g. a document creation application or spreadsheet application. The application 201 provides a print settings user interface for making settings of print functions used to generate print data, for example, a booklet print settings screen 601, described hereinafter with reference to FIG. 6. Further, when the application 201 receives a print request from a user, the application 201 issues a print instruction to the OS 202. The print instruction includes print settings information for instructing operations of the print data generation software 203 and operations of the printer 102. The print settings information is also referred to as the PT (Print Ticket) and is described in Extensible Markup Language (XML). The PT includes the settings of print functions.

FIG. 3 is a diagram showing an example of PT generated in the host computer 101 shown in FIG. 1. In the PT shown in FIG. 3, denoted by reference numeral 301, an option (described as "Option") is described in a hierarchical structure for each print function (described as "Feature"). For example, in the PT 301, the option of Plain is set for the feature 302 of PageMediaType.

In the present embodiment, a user provides a print request after making settings of print functions on a screen displayed on the display section 119, such as a print settings screen 501, described hereinafter with reference to FIG. 5, or the booklet print settings screen 601, described hereinafter with reference to FIG. 6. The print settings screen 501 and the booklet print settings screen 601 are displayed based on print function information generated by the print data generation software 203. The print function information is information indicating print functions which can be set on the print settings user interface. The print function information is also referred to as the PC (Print Capabilities) and is described in XML. The print settings screen 501 and the booklet print settings screen 601 each include setting items (hereinafter referred to as the "control items") for making settings of print functions. The PC is determined by the print data generation software 203 based on management information 204. The management information 204 is data for managing information related to the print functions and includes all print functions which can be set by the print data generation software 203 and settings of the print functions, as well as information indicating an exclusive relationship between the settings. The management information 204 is included e.g. in a configuration file of the print data generation software 203, and is stored in the external storage device 114 as an immutable file. Note that the management information 204 may be dynamically generated by the print data generation software 203.

FIG. 4 is a diagram showing an example of PC generated in the host computer 101 shown in FIG. 1. In the PC shown in FIG. 4, denoted by reference numeral 401, options are described for each print function (Feature) in a hierarchical structure. For example, in the PC 401, the option of Plain and the option of PhotoPaper are set for the feature 402 of PageMediaType. Further, in the PC 401, e.g. the properties 403 and 404 of DisplayName indicating a display name are set as child elements (supplementary information) of each option.

Referring again to FIG. 2, the OS 202 is e.g. Windows (registered trademark) of Microsoft (registered trademark) and is equipped with a print support function. The OS 202 provides print settings user interface on which settings of print functions used to generate print data are made, for example, the print settings screen 501 described hereinafter with reference to FIG. 5. Further, the OS 202 generates intermediate data based on a print instruction received from the application 201 and passes the intermediate data to the print data generation software 203. The intermediate data includes drawing data as information on a picture to be formed on a sheet and PT generated based on the settings set by the user. The print data generation software 203 converts the acquired intermediate data to print data which can be interpreted by the printer 102 and transmits the print data to the printer 102. The printer 102 performs print processing based on the received print data.

Figure 5:
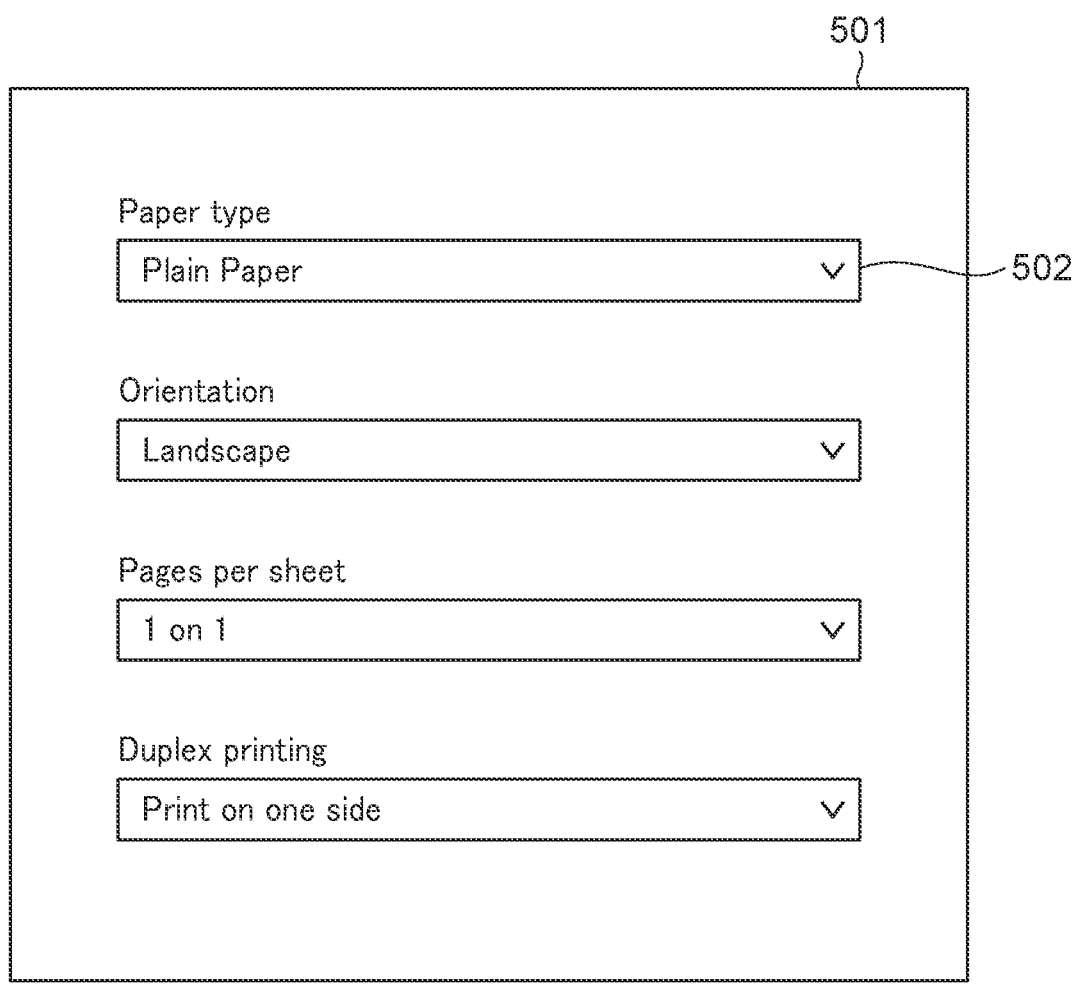
FIG. 5 is a diagram showing an example of a print settings screen displayed on a display section appearing in FIG. 1.

FIG. 5 is a diagram showing an example of the print settings screen 501 displayed on the display section 119 appearing in FIG. 1. The print settings screen 501 is a screen for making settings of print functions, such as settings of a type of a sheet to be printed, orientation of the sheet, layout printing, and single-sided/double-sided printing. The print settings screen 501 is displayed on the display section 119 by the OS 202 when the user provides an instruction for displaying the print settings screen 501 on the application 201. The OS 202 acquires PC and PT, generated by the print data generation software 203, from the print data generation software 203 and displays the print settings screen 501 on the display section 119 based on the acquired PC and PT. The dropdown list of a control item 502 on the print settings screen 501 includes, for example, "Plain Paper" and "Photo Paper" which are the two options of the feature 402 of PageMediaType in the PC 401 generated by the print data generation software 203. Further, the print settings screen 501 is displayed in a state in which "Plain Paper" is selected for the control item 502 based on the description of the feature 302 of PageMediaType in the PT 301 generated by the print data generation software 203. When the user changes the setting of the control item 502 to "Photo Paper" on this print settings screen 501, the OS 202 changes the option of the feature 302 of PageMediaType in the PT 301 to "Photo Paper".

Figure 6:
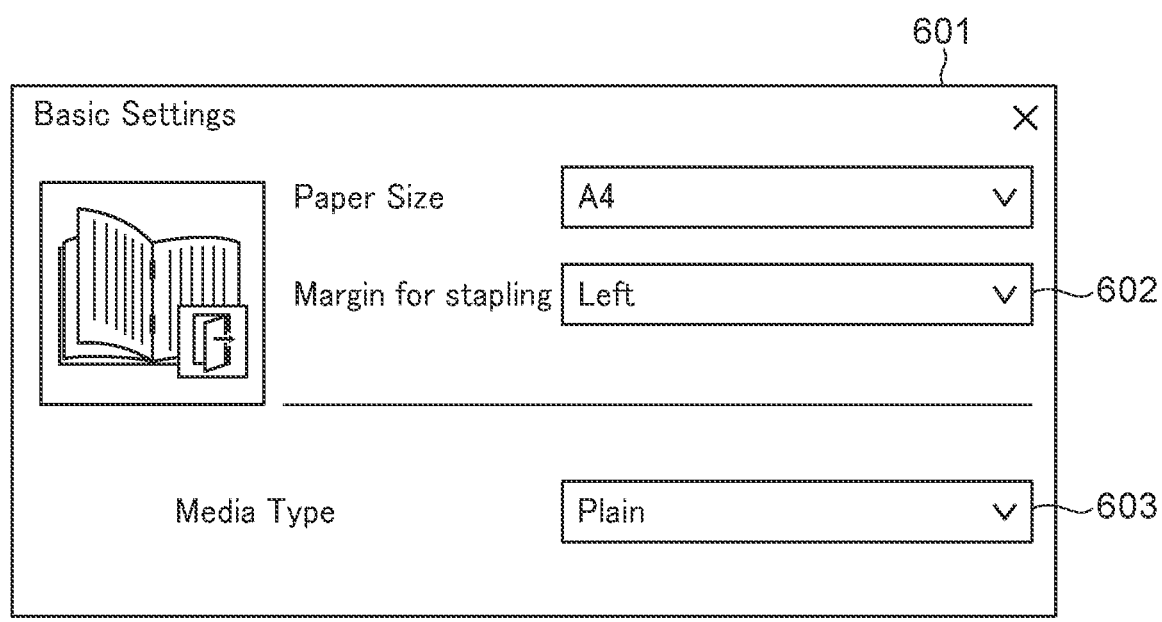
FIG. 6 is a diagram showing an example of a booklet print settings screen displayed on the display section appearing in FIG. 1.

FIG. 6 is a diagram showing an example of the booklet print settings screen 601 displayed on the display section 119 appearing in FIG. 1. The booklet print settings screen 601 is a screen for making settings of print functions related to booklet printing. The booklet print settings screen 601 is displayed on the display section 119 by the application 201 when the user provides an instruction for displaying the booklet print settings screen 601 on the application 201. The application 201 acquires PC and PT, generated by the print data generation software 203, from the OS 202 and displays the booklet print settings screen 601 on the display section 119 based on the acquired PC and PT. On the booklet print settings screen 601, there are displayed, for example, the dropdown list of a control item 602 for specifying how to bind the booklet and the dropdown list of a control item 603 for specifying a sheet type. Note that in booklet printing, printing is performed on a front side and a reverse side of a sheet, respectively, and hence it is preferable that a sheet type on which double-sided printing cannot be performed is not listed in the control item 603.

Incidentally, in a case where information specifying how to bind the booklet, information on whether double-sided printing can be performed, and the like, which are necessary for the display of the booklet print settings screen 601, are not included in the acquired PT, the application 201 passes PT 701 shown in FIG. 7 to the OS 202 in order to acquire these information items (such as the information specifying how to bind the booklet and information on whether double-sided printing can be performed). The OS 202 passes this PT 701 to the print data generation software 203. In the PT 701, there is set the property 702 of AdvancedMode which is predetermined setting information for causing the print data generation software 203 to generate PT and PC to which these information items are added. The print data generation software 203 sets an advanced mode to one based on the description of the property 702 of AdvancedMode in the acquired PT 701. When the advanced mode is set to on, the print data generation software 203 generates PT and PC to which the above-mentioned information items (such as the information specifying how to bind the booklet and information on whether double-sided printing can be performed) are added. Then, the print data generation software 203 passes the generated PT and PC to the OS 202, and the OS 202 passes the PT and PC to the application 201. Note that in the present embodiment, "ALL" is specified as shown in FIG. 7. Therefore, the print data generation software 203 sends the PT and PC, in which all information on the functions, which can be described in the PT and PC, is described, to the application 201 as a response. In other words, the print data generation software 203 generates the PT and PC, in which are described all information on the functions, which can be described in the PT and PC, including the information specifying how to bind the booklet and the information on whether the double-sided printing can be performed. As a result, the application 201 can display the booklet print settings screen 601 on the display section 119 based on the PT and PC to which the above-described information is added.

Next, generation of the PC by the host computer 101 will be described.

Figure 8:
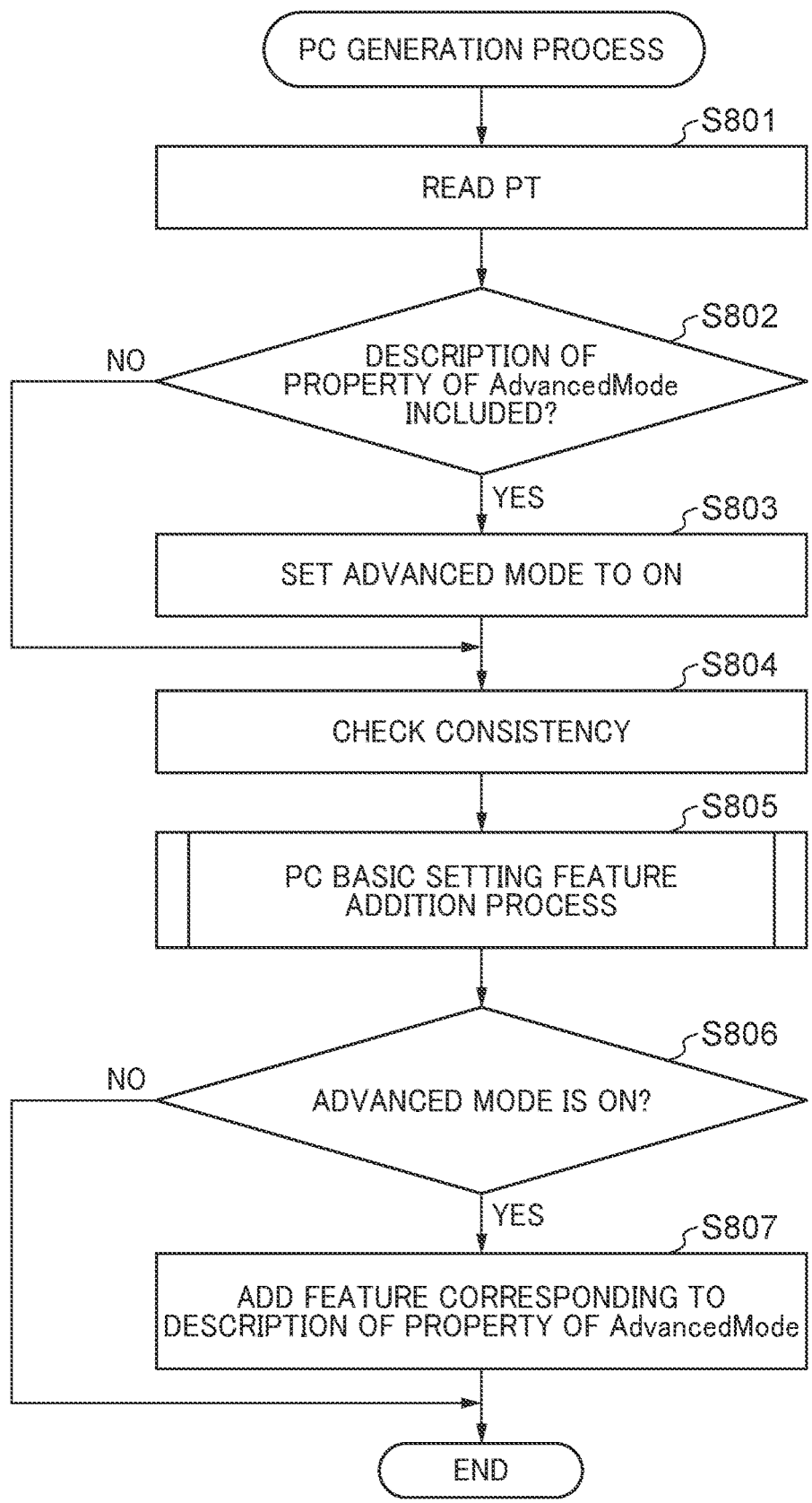
FIG. 8 is a flowchart of a PC generation process performed by print data generation software appearing in FIG. 2.

FIG. 8 is a flowchart of a PC generation process performed by the print data generation software 203 appearing in FIG. 2. The PC generation process in FIG. 8 is executed when a user provides an instruction for displaying print settings user interface, such as the booklet print settings screen 601, on the application 201. Note that the user may display the print settings screen 501 by performing an operation on the application 201. When this display instruction is provided, PT (such as the PT 301 or PT 701) is sent to the print data generation software 203 as the instruction for generating PC to be used for generation of the print settings user interface.

Referring to FIG. 8, first, the print data generation software 203 reads the acquired PT (step S801). Note that information described as PageDevmodeSnapshot (not shown), generated by converting settings of all print functions to binary data, is written in the PT, and a setting of a print function which is not defined in the PT as Feature is read from this information. Then, the print data generation software 203 determines whether or not description of the property of AdvancedMode is included in the acquired PT (step S802). For example, in a case where the PT shown in FIG. 7 is received, since the description of the property of "AdvancedMode" is included, the answer to the question of the step S802 is affirmative (Yes).

If it is determined in the step S802 that the description of the property of AdvancedMode is not included in the acquired PT, the process proceeds to a step S804, described hereinafter. If it is determined in the step S802 that the description of the property of AdvancedMode is included in the acquired PT, the print data generation software 203 sets the advanced mode to on (step S803).

Then, the print data generation software 203 checks consistency of the settings of the print functions, obtained by reading the PT in the step S801 (step S804). More specifically, the print data generation software 203 checks whether or not a conflict has occurred in the print settings described in the PT. If it is determined that a conflict has occurred, the print data generation software 203 corrects the PT to PT having no conflict. Then, the print data generation software 203 performs a PC basic setting feature addition process in FIG. 9 using the consistent settings (step S805) to add a basic setting feature to the PC. The basic setting feature is a feature of a print function corresponding to a consistent setting and is a feature which is generally often used, such as a sheet size or a sheet type. In the present embodiment, the process in the step S805 will be described based on an example of the process in which the print data generation software 203 adds the feature of PageMediaType, which corresponds to the print function of the sheet type, as a basic setting feature, to the PC.

Figure 9:
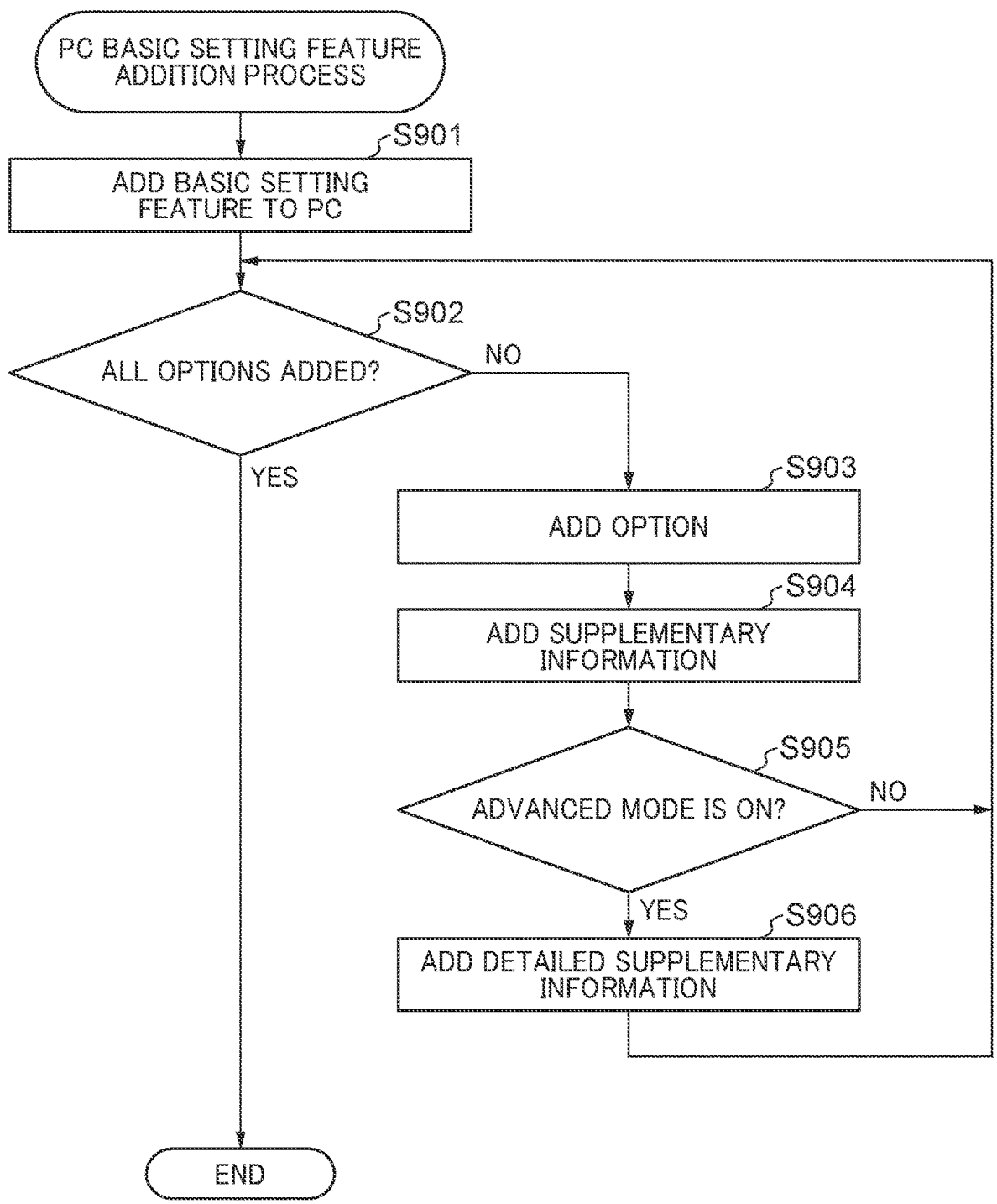
FIG. 9 is a flowchart of a PC basic setting feature addition process performed in a step in FIG. 8.

FIG. 9 is a flowchart of the PC basic setting feature addition process in the step S805 in FIG. 8.

Referring to FIG. 9, the print data generation software 203 adds a basic setting feature corresponding to a consistent setting to the PC (step S901). In the step S901, for example, the print data generation software 203 adds a node of the feature 1002 of PageMediaType except the option 1003 of Plain, the property 1004 of DisplayName, and the scored property (described as ScoredPropery) 1005 of Duplex Printing, which corresponds to the print function of the sheet type, to PC 1001 shown in FIG. 10.

Then, the print data generation software 203 determines whether or not all of the options in the feature 1002 of PageMediaType, which is the feature added in the step S901, have been added to the PC (step S902).

If it is determined in the step S902 that any of the options in the feature 1002 of PageMediaType has not been added, the process proceeds to a step S903. In the step S903, the print data generation software 203 adds an option which has not been added, for example, the option 1003 of Plain as an option of the feature 1002 of PageMediaType. Then, the print data generation software 203 adds supplementary information to the option 1003 of Plain as required (step S904). In the step S904, for example, the property 1004 of DisplayName is added to the option 1003 of Plain as the supplementary information. Note that "DisplayName" is a character string representing information on an option to be displayed on the print settings user interface. Then, the print data generation software 203 determines whether or not the advanced mode is set to on (step S905).

If it is determined in the step S905 that the advanced mode is set to on, the print data generation software 203 adds the detailed supplementary information corresponding to the description of the property of AdvancedMode as an option (step S906). For example, the print data generation software 203 adds the scored property 1005 of Duplex Printing as the detailed supplementary information corresponding to the description of the property of AdvancedMode. The scored property 1005 of Duplex Printing is the supplementary information specific to the vendor. For example, in FIG. 10, "Supported" is set for the option of "Plain" as the detailed supplementary information. This means that plain paper is a sheet of a type which can be used for double-sided printing. Further, in FIG. 10, "None" is set to the option of "Photopaper" as the detailed supplementary information. This means that photo paper is a sheet of a type which cannot be used for double-sided printing. Then, the process returns to the step S902. Thus, in the present embodiment, in a case where the description of the property of AdvancedMode is included in the acquired PT, the detailed supplementary information corresponding to the description of the property of AdvancedMode is added to the information on the basic setting print function.

If it is determined in the step S905 that the advanced mode is not on, the process returns to the step S902 without executing the step S906. Thus, in the present embodiment, in a case where the description of the property of AdvancedMode is not included in the acquired PT, the detailed supplementary information corresponding to the description of the property of AdvancedMode is not added to the information on the basic setting print function.

If it is determined in the step S902 that all of the options in the feature 1002 of PageMediaType have been added, the process for generating the feature of PageMediaType is terminated. Then, the process proceeds to a step S806 in FIG. 8. Note that in a case where there are a plurality of basic setting print functions, the above-described PC basic setting feature addition process is executed with respect to all of the basic setting print functions each corresponding to a consistent setting. Thus, all of the basic setting features each corresponding to the consistent setting are added to the PC.

In the step S806, the print data generation software 203 determines whether or not the advanced mode is set to on. If it is determined in the step S806 that the advanced mode is set to on, the print data generation software 203 adds a feature corresponding to the description of the property of AdvancedMode to the PC (step S807). This feature is, for example, a feature which is other than the basic setting features and corresponds to a print function which the print data generation software 203 can specify, out of the plurality of print functions which the print data generation software 203 can set. As described above, "ALL" is described in the PT shown in FIG. 7. Therefore, the print data generation software 203 adds all of the features which are other than the basic setting features and correspond to the print functions permitted by the print data generation software 203 to be described in the PC in the step S807. As a result, for example, the print data generation software 203 adds the features other than the basic setting features, including the feature 1006 of JobBookletStapleSide, to the PC 1001. After that, the present process is terminated.

If it is determined in the step S806 that the advanced mode is not set to on, the present process is terminated without executing the step S807.

According to the above-described processes in FIGS. 8 and 9, in a case where the description of the property of AdvancedMode is not included in the acquired PT, a first PC including information on the basic setting print functions but not including information corresponding to the description of the property of AdvancedMode is generated. Further, in a case where the description of the property of AdvancedMode is included in the acquired PT, a second PC including information on the print functions corresponding to the acquired PT and including information corresponding to the description of the property of AdvancedMode is generated. That is, only in a case where a request is received from the application 201 or the OS 202, PC including the information corresponding to the description of the property of AdvancedMode is generated. With this, the print data generation software 203 can reduce the load of the process for generating PC used for generation of the print settings user interface, whereby it is possible to reduce the load of processing related to the provision of the print settings user interface.

Further, in the above-described processes in FIGS. 8 and 9, the second PC includes the information on all basic setting print functions, included in the first PC. With this, in a case where there is no request e.g. from the application 201, the information to be included in the PC is reduced, whereby the load of processing related to the provision of the print settings user interface is reduced. On the other hand, in a case where a request is received e.g. from the application 201, PC covering information necessary for generation of the print settings user interface is provided to the requesting source.

Further, in the above-described processes in FIGS. 8 and 9, since the PT and the PC are described in XML, it is possible to reduce the time required for generation of the PT and the PC, which requires more time as the amount of described information is larger.

Note that in the present embodiment, the second PC is not necessarily required to include the information on part of basic setting print functions, included in the first PC, or the information on all basic setting print functions, included in the first PC. For example, in the PC generation process described with reference to FIG. 8, after execution of the step S804, the process proceeds to the step S806. If it is determined in the step S806 that the advanced mode is not set to on, the process for adding information on a basic setting print function, such as a basic setting feature, an option, and supplementary information, to the PC is performed. On the other hand, if it is determined in the step S806 that the advanced mode is set to on, the process for adding the description of e.g. a feature corresponding to the description of the property of AdvancedMode, an option, supplementary information, and detailed supplementary information, to the PC is performed. At this time, part of the basic setting features, options, and supplementary information, included in the first PC, can be added to the PC. By performing this control, it is possible to reduce the load of processing related to the provision of the print settings user interface by the application, which requires information corresponding to the description of the property of AdvancedMode but does not require information on part or all of the basic setting print functions included in the first PC.

Next, generation of the PT by the host computer 101 will be described.

Figure 11:
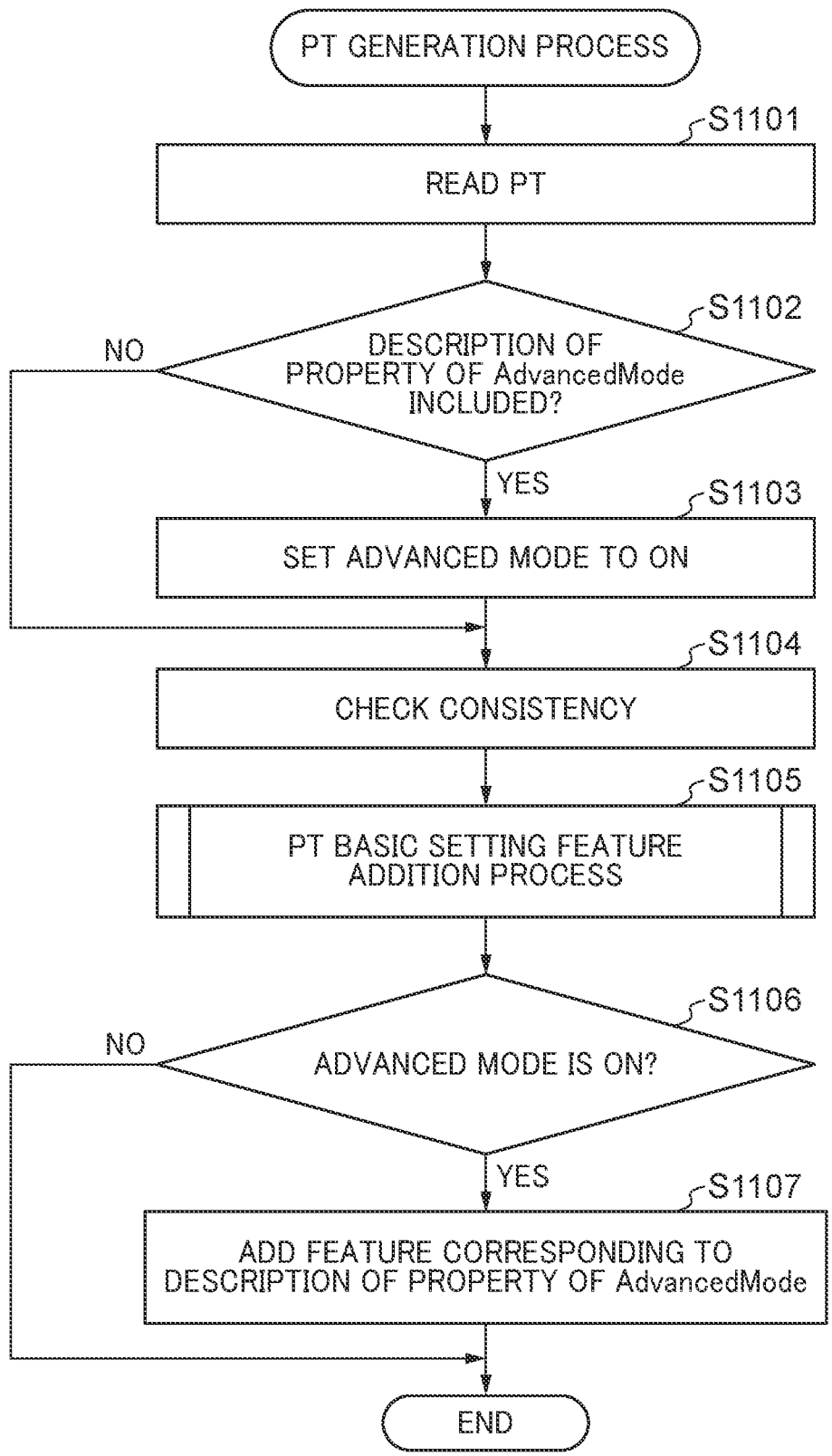
FIG. 11 is a flowchart of a PT generation process performed by the print data generation software appearing in FIG. 2.

FIG. 11 is a flowchart of a PT generation process performed by the print data generation software 203 appearing in FIG. 2. Note that the PT generation process in FIG. 11 is similar to the PC generation process in FIG. 8, and the following description will be particularly given of points different from the PC generation process in FIG. 8. Similar to the PC generation process in FIG. 8, the PT generation process in FIG. 11 is also executed when the user provides an instruction for displaying print settings user interface, such as the booklet print settings screen 601, on the application 201. Note that the user can display the print settings screen 501 by performing an operation on the application 201. When this display instruction is provided, PT (such as the PT 301 or PT 701) is sent to the print data generation software 203 as the instruction for generating PT to be used for generation of the print settings user interface. Note that the PT generation process in FIG. 11 and the PC generation process in FIG. 8 can be executed in parallel or can be executed continuously. In a case where the PT generation process and the PC generation process are continuously executed, either of the PT generation process and the PC generation process can be executed first.

Referring to FIG. 11, similar to the step S801, first, the print data generation software 203 reads the acquired PT (step S1101). Then, similar to the step S802, the print data generation software 203 determines whether or not the description of the property of AdvancedMode is included in the acquired PT (step S1102).

If it is determined in the step S1102 that the description of the property of AdvancedMode is not included in the acquired PT, the process proceeds to a step S1104, described hereinafter. If it is determined in the step S1102 that the description of the property of AdvancedMode is included in the acquired PT, the process proceeds to a step S1103. Similar to the step S803, in the step S1103, the print data generation software 203 sets the advanced mode to on.

Then, similar to the step S804, the print data generation software 203 checks consistency of the settings of the print functions, which are obtained by reading the PT in the step S1101 (step S1104). Then, the print data generation software 203 performs a PT basic setting feature addition process in FIG. 12 using consistent settings (step S1105), and adds basic setting features to the PT. In the present embodiment, the process in the step S1105 will be described based on an example of the process in which the print data generation software 203 adds the feature of PageMediaType corresponding to the print function of the sheet type to the PT as a basic setting feature.

FIG. 12 is a flowchart of the PT basic setting feature addition process in the step S1105 in FIG. 11.

Referring to FIG. 12, the print data generation software 203 adds the basic setting feature corresponding to the consistent setting to the PT (step S1201). In the step S1201, for example, the print data generation software 203 adds the feature 1302 of PageMediaType corresponding to the print function of the sheet type to TP 1301 shown in FIG. 13. Then, the print data generation software 203 adds an option, for example, the option of Plain to the feature 1302 of PageMediaType, which is the feature added in the step S1201 (step S1202). Then, the print data generation software 203 adds supplementary information to the option of Plain as required (step S1203). Note that there is no supplementary information for the option of Plain which is the option of the sheet type, and hence nothing is added in the step S1203. Then, the print data generation software 203 determines whether or not the advanced mode is set to on (step S1204).

If it is determined in the step S1204 that the advanced mode is set to on, the print data generation software 203 adds the detailed supplementary information corresponding to the description of the property of AdvancedMode as an option (step S1205). Note that in the option of Plain as the option of the sheet type, there is no detailed supplementary information corresponding to the description of the property of AdvancedMode, and hence nothing is added in the step S1205. After that, the process for generating the feature of PageMediaType is terminated, and the process proceeds to a step S1106 in FIG. 11.

If it is determined in the step S1204 that the advanced mode is not set to on, the process for generating the feature of PageMediaType is terminated without executing the step S1205, and the process proceeds to the step S1106 in FIG. 11. Note that in a case where there are a plurality of basic setting print functions, the above-described PT basic setting feature addition process is executed with respect to all of the basic setting print functions each corresponding to a consistent setting. Thus, all of the basic setting features each corresponding to a consistent setting are added to the PT. When all of the basic setting features are added to the PT, the process proceeds to the step S1106 in FIG. 11.

In the step S1106, the print data generation software 203 determines whether or not the advanced mode is set to on. If it is determined in the step S1106 that the advanced mode is set to on, the print data generation software 203 adds a feature corresponding to the description of the property of AdvancedMode to the PT (step S1107). As mentioned above, "ALL" is described in the PT shown in FIG. 7. Therefore, the print data generation software 203 adds all of features corresponding to the description of the property of AdvancedMode, which correspond to print functions permitted by the print data generation software 203 to be described in the PT. As a result, for example, the print data generation software 203 adds the feature 1303 of JobBookletStapleSide to the PT 1301. After that, the PT generation process is terminated. Thus, in the present embodiment, in a case where the description of the property of AdvancedMode is included in the acquired PT, PT including the information on the basic setting print functions and the information corresponding to the description of the property of AdvancedMode is generated.

If it is determined in the step S1106 that the advanced mode is not set to on, the PT generation process is terminated without executing the step S1107. Thus, in the present embodiment, in a case where the description of the property of AdvancedMode is not included in the acquired PT, PT including the information on the basic setting print functions but not including the information corresponding to the description of the property of AdvancedMode is generated.

The print data generation software 203 passes the PC generated by the PC generation process, such as the PC 1001, and the PT generated by the PT generation process, such as the PT 1301, to the OS 202. The OS 202 passes the PC 1001 and the PT 1301 to the application 201 as the requesting source.

The application 201 causes the booklet print settings screen 601 to be displayed on the display section 119 based on the acquired PC 1001 and PT 1301. The application 201 causes the dropdown list of the control item 602 to include Left_or_Top and Right_or_Bottom which are the options of the feature 1006 of JobBookletStapleSide of the PC 1001. Further, the application 201 causes the booklet print settings screen 601 to be displayed on the display section 119, based on the feature 1303 of JobBookletStapleSide of PT 1301, in a state in which Left (Left_or_Top) is selected.

Further, the application 201 causes the dropdown list of the control item 603 to include, out of Plain and PhotoPaper which are the options of the feature of PageMediaType 1002 of the PC 1001, only Plain as an option including the scored property 1005 of Duplex Printing for which "Supported" is set. Further, based on the feature of PageMediaType 1302 of the PT 1301, the application 201 causes the booklet print settings screen 601 to be displayed on the display section 119 in a state in which Plain is selected. With this, the booklet print settings screen 601 on which a setting suitable for booklet printing can be selected is displayed on the display section 119.

According to the above-described processes in FIGS. 11 and 12, in a case where the description of the property of the advanced mode is not included in the acquired PT, a first PT including information on the basic setting print functions but not including information corresponding to the description of the property of the advanced mode is generated. Further, in a case where the description of the property of the advanced mode is included in the acquired PT, a second PT including information on the print functions corresponding to the acquired PT and informing corresponding to the description of the property of advanced mode is generated. That is, only in a case where a request is received from the application 201 or the OS 202, the PT including the information corresponding to the description of the property of the advanced mode is generated. This makes it possible to reduce the load of the process for generating the PC used for generation of the print settings user interface, whereby it is possible to reduce the load of processing related to the provision of the print settings user interface.

Further, in the above-described processes in FIGS. 11 and 12, the second PT includes the information on all of the basic setting print functions included in the first PT. This reduces the information to be included in the PT in a case where there is no request from the application 201 or the OS 202, which reduces the load of processing related to the provision of the print settings user interface. Further, in a case where a request is received from the application 201 or the OS 202, the PT covering information necessary for generation of the print settings user interface is provided to the requesting source.

Note that in the present embodiment, the second PT is not necessarily required to include the information on part of the basic setting print functions included in the first PT, or the information on all of the basic setting print functions included in the first PT. For example, in the above-described PT generation process, after execution of the step S1104, the process proceeds to the step S1106. If it is determined in the step S1106 that the advanced mode is not set to on, the process for adding information on a basic setting print function, such as a basic setting feature, an option, and supplementary information, to the PT is performed. On the other hand, if it is determined in the step S1106 that the advanced mode is set to on, the process for adding the description of a feature, an option, supplementary information, and detailed supplementary information, which corresponds to the description of the property of the advanced mode, to the PT is performed. At this time, a feature, an option, and supplementary information on part of the basic settings included in the first PT can be added to the PT. By performing this control, it is possible to reduce the load of processing related to the provision of the print settings user interface by the application which requires the information corresponding to the description of the property of the advanced mode but does not require the information on part or all of the basic setting print functions included in the first PT.

Further, although in the present embodiment, the description has been given of the configuration for controlling the number of items of the features, this is not limitative, but the number of other items described in the PT and the PC, such as Property or ParameterDef, may be controlled.

In the present embodiment, a function specific to the vendor may be included in the basic setting print functions. Further, as print functions corresponding to the description of the property of the advanced mode, print functions defined by the OS 202 (public functions) can be included.

Further, in the present embodiment, as shown in PT 1401 shown in FIG. 14, a print function corresponding to information to be added can be set as a value of the property of AdvancedMode in the PT as an instruction for generating PC used for generation of the print settings user interface. For example, in the property 1402 of AdvancedMode of the PT 1401 shown in FIG. 14, "Booklet" indicating the print function of booklet printing is set.

Figure 15:
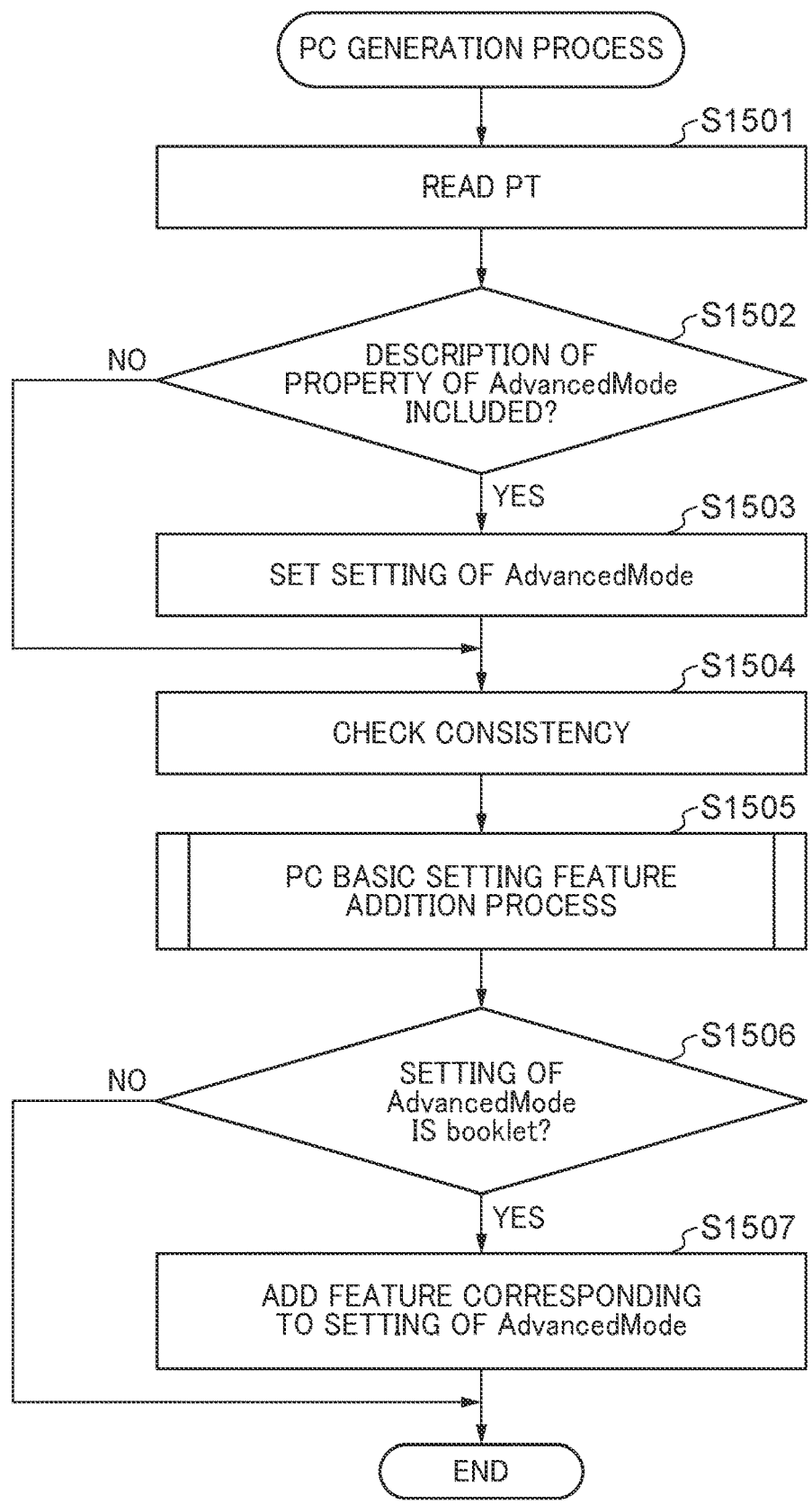
FIG. 15 is a flowchart of a variation of the PC generation process performed by the print data generation software appearing in FIG. 2.

FIG. 15 is a flowchart of a variation of the PC generation process performed by the print data generation software 203 appearing in FIG. 2. Note that the PC generation process in FIG. 15 is similar to the PC generation process in FIG. 8, and the following description will be particularly given of points different from the PC generation process in FIG. 8. The PC generation process in FIG. 15 is also executed when the user provides an instruction for displaying the print settings user interface, such as the booklet print settings screen 601, on the application 201. When this display instruction is provided, PT (such as the PT 1401) is sent to the print data generation software 203, as the instruction for generating PC to be used for generation of the print settings user interface.

Referring to FIG. 15, first, steps S1501 and S1502 which are the same processing operations as the steps S801 and S802 are executed. Then, the print data generation software 203 acquires the value of the property of AdvancedMode. Then, the print data generation software 203 sets the acquired value as the setting of the advanced mode (step S1503). For example, in a case where the PT read in the step S1501 is the PT 1401, "Booklet" as the value of the property 1402 of AdvancedMode is set in the step S1503. Then, a step S1504 which is the same processing as the step S804 is executed. Then, the print data generation software 203 performs a PC basic setting feature addition process in FIG. 16 using a consistent setting (step S1505) to add a basic setting feature to the PC. In the present embodiment, the step S1505 will be described based on an example of the process in which the print data generation software 203 adds a feature of PageMediaType corresponding to the print function of the sheet type to the PC as a basic setting feature.

Figure 16:
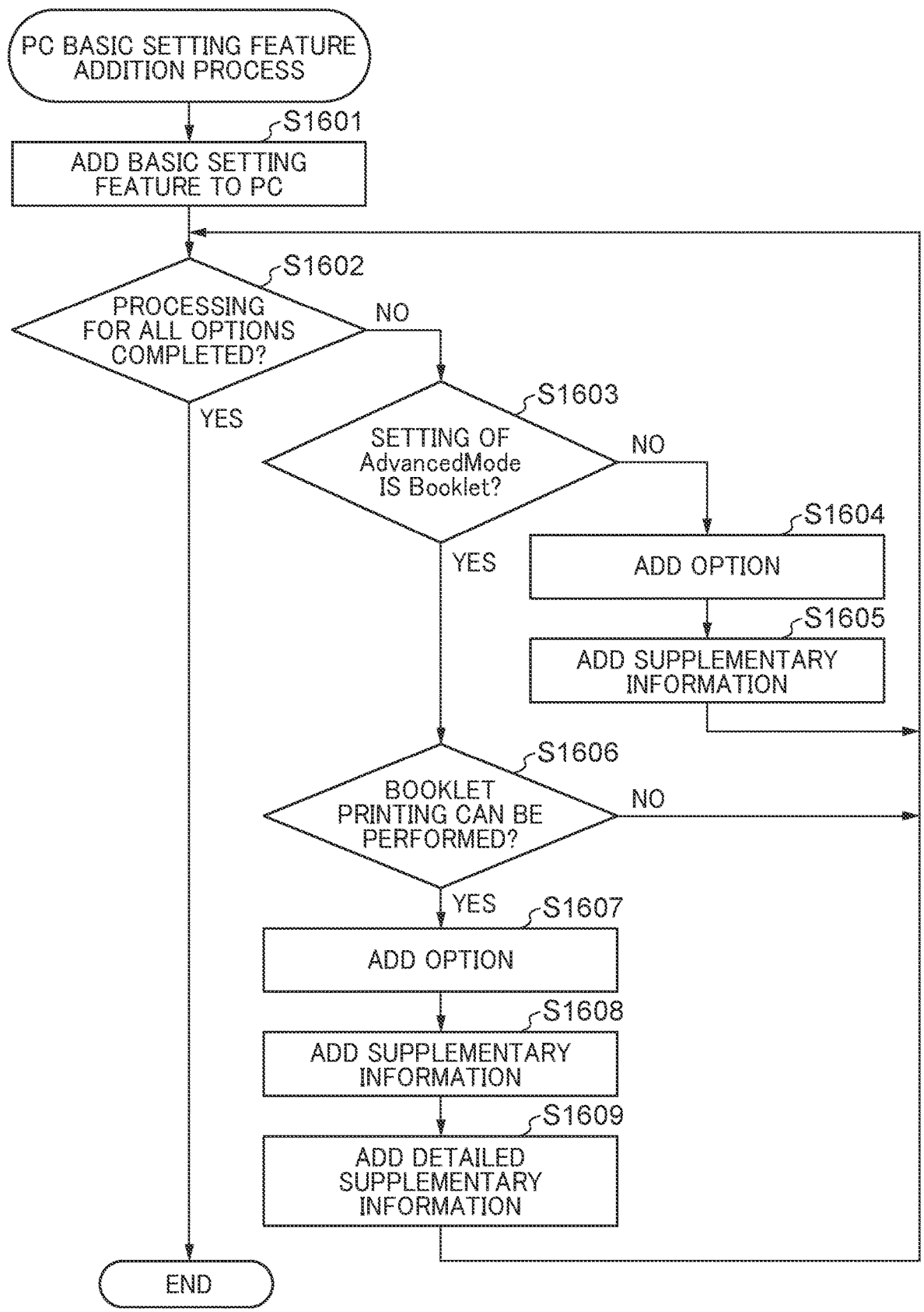
FIG. 16 is a flowchart of a PC basic setting feature addition process performed in a step in FIG. 15.

FIG. 16 is a flowchart of the PC basic setting feature addition process in the step S1505 in FIG. 15. Note that the PC basic setting feature addition process in FIG. 16 is similar to the PC basic setting feature addition process in FIG. 9, and the following description will be particularly given of points different from the PC basic setting feature addition process in FIG. 9.

Referring to FIG. 16, first, a step S1601 which is the same processing as the step S901 is executed. In the step S1601, for example, a node of the feature 1702 of PageMediaType, which corresponds to the print function of the sheet type, is added to PC 1701 shown in FIG. 17. Note that in the step S1601, a node of the feature 1702 of PageMediaType except the option 1703 of Plain, the property 1704 of DisplayName, and the feature 1705 of JobBookletStapleSide is added to the PC.

Then, the print data generation software 203 determines whether or not all processing for the options of the feature 1702 of PageMediaType, which is the feature added in the step S1601, is completed (step S1602).

If it is determined in the step S1602 that processing has not been completed with respect to any of the options of the feature 1702 of PageMediaType, the process proceeds to a step S1603. In the step S1603, the print data generation software 203 determines whether or not the setting of AdvancedMode is "Booklet".

If it is determined in the step S1603 that the setting of AdvancedMode is not "Booklet", steps S1604 and S1605 which are the same processing operations as the steps S903 and S904 are executed, and then the process returns to the step S1602. Note that the steps S1604 and S1605 are executed in a case where the setting of AdvancedMode is not "Booklet", but "ALL" is specified. However, in a case where the description of the property of AdvancedMode is not included, or in a case where the setting of AdvancedMode is not "Booklet" but "False", or in a case where the description of AdvancedMode itself is not included, the process returns to the step S1602 without executing the steps S1604 and S1605.

If it is determined in the step S1603 that the setting of AdvancedMode is "Booklet", the print data generation software 203 selects one of options which have not been added. Then, the print data generation software 203 determines whether or not-booklet printing can be performed for the selected option (step S1606).

If it is determined in the step S1606 that booklet printing cannot be performed for the selected option, the print data generation software 203 does not add the selected option to the PC 1701 and the process returns to the step S1602. Thus, in the present embodiment, in a case where the setting of AdvancedMode is "Booklet", the option for which booklet printing cannot be performed is not added to the PC 1701.

If it is determined in the step S1606 that booklet printing can be performed for the selected option, the process proceeds to a step S1607. In the step S1607, the print data generation software 203 adds the selected option, such as the option 1703 of Plain, to the feature 1702 of PageMediaType. Then, the print data generation software 203 adds supplementary information to the option 1703 as required (step S1608). In the step S1608, for example, the property 1704 of DisplayName is added to the option 1703. Then, the print data generation software 203 adds detailed supplementary information corresponding to "Booklet" as a setting of AdvancedMode to the option 1703 (step S1609). Note that in the process in FIG. 16, only the option for which booklet printing can be performed is added to the feature, and hence it is not necessary to add the scored property 1005 of Duplex Printing indicating whether double-sided printing can be performed, as the detailed supplementary information, as in the process in FIG. 9. Therefore, in the step S1609, nothing is added. After that, the process returns to the step S1602.

If it is determined in the step S1602 that the process has been completed with respect to all of the options of the feature 1702 of PageMediaType, the process for generating the feature of PageMediaType is terminated, and the process proceeds to a step S1506. Note that in a case where there are a plurality of basic setting print functions, the above-described PC basic setting feature addition process is executed with respect to all of the basic setting print functions each corresponding to a consistent setting. When all of the basic setting features are added to the PC, the process proceeds to the step S1506.

In the step S1506, the print data generation software 203 determines whether or not the setting of AdvancedMode is "Booklet". If it is determined in the step S1506 that the setting of AdvancedMode is not "Booklet", the PC generation process is terminated. If it is determined in the step S1506 that the setting of AdvancedMode is "Booklet", the process proceeds to a step S1507. In the step S1507, the print data generation software 203 adds a feature indicating the print function corresponding to "Booklet" which is a setting of AdvancedMode to the PC. For example, the feature 1705 of JobBookletStapleSide is added to the PC 1701. After that, the PC generation process is terminated. Note that in a case where it is determined in the step S1506 that the setting of AdvancedMode is "ALL", the step S807 in the process in FIG. 8 may be executed in place of the step S1507 in the process in FIG. 15.

In the above-described processes in FIGS. 15 and 16, a print function corresponding to information to be added is set as a value of the property of AdvancedMode in the PT as an instruction for generating PC used for generation of the print settings user interface. With this, it is possible to control the information to be added to the PC only to the information on the print function set as the value of the property of AdvancedMode, which makes it possible to reduce the load of processing related to the provision of the print settings user interface.

Note that in the present embodiment, the description has been given based on the case where "Booklet" indicating the print function of booklet printing is set as the value of the property of AdvancedMode, by way of example. However, this is not limitative, but a print function other than booklet printing can be set as this value.

Further, in the present embodiment, a setting indicating the necessity/unnecessity of predetermined supplementary information can be set in the PT as the instruction for generating PC to be used for generation of the print settings user interface. For example, there is a case where even when the print settings user interface to be displayed is based on the PT and the PC, a name specific to the application 201 or the OS 202 is used for a function name to be displayed. In this case, DisplayName included in the PC becomes unnecessary, and it is preferable that a description corresponding to DisplayName is not included in the PC from the viewpoint of reducing the load of processing related to the provision of the print settings user interface. In contrast, in the present embodiment, a setting indicating the necessity/unnecessity of the predetermined supplementary information, such as a description corresponding to DisplayName, is set in the PT as the instruction for generating PC to be used for generation of the print settings user interface. For example, PT 1801 shown in FIG. 18 includes the property 1802 of AdvancedMode and the property 1803 of IsNeedDisplayName. The property 1803 of IsNeedDisplayName is a description for specifying whether or not to cause a function name added to a feature, an option, or the like to be included in the PC. A value of "No" is set as the value of the property 1803 of IsNeedDisplayName, which means that the function name is not caused to be included.

When the print data generation software 203 acquires the PT 1801, for example, the print data generation software 203 generates PC 1901 shown in FIG. 19 and sends the PC 1901 to the application 201 as a response. The description of DisplayName is not included in the feature 1902 and the option 1903 of the PC 1901.

As described above, by setting a setting indicating the necessity/unnecessity of the predetermined supplementary information in the PT as the instruction for generating PC to be used for generation of the print settings user interface, it is possible to reduce the load of the process for generating PC.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151346 filed Sep. 22, 2022, which is hereby incorporated by reference herein in its entirety.

What is claimed is:

1. A non-transitory computer-readable storage medium storing a program for causing a computer to execute a method of controlling an information processing apparatus, wherein the method comprises:
    displaying, in a case where predetermined information is not received from an application program for generating image data, a first print setting screen including at least a first setting item; and
    displaying, in a case where the predetermined information is received from the application program, a second print setting screen including at least the first setting item and a second setting item, the second setting item being not included in the first print setting screen.

2. The non-transitory computer-readable storage medium according to claim 1, wherein the first setting item includes a size of a sheet on which an image based on the image data is to be printed.

3. The non-transitory computer-readable storage medium according to claim 1, wherein the first setting item includes a type of a sheet on which an image based on the image data is to be printed.

4. The non-transitory computer-readable storage medium according to claim 1, wherein the second setting item includes a booklet staple setting.

5. The non-transitory computer-readable storage medium according to claim 1, wherein the method further comprises:
    including, in a case where the predetermined information is received from the application program for generating image data, the second setting item in print capabilities for displaying the first setting screen,
    wherein, in a case where the predetermined information is not received from the application program for generating image data, the second item is not included in the print capabilities.

6. The non-transitory computer-readable storage medium according to claim 5, wherein the print capabilities are described in an XML language.

7. The non-transitory computer-readable storage medium according to claim 1, wherein the predetermined information is an advanced mode property.

8. A control method for controlling an information processing apparatus, the method comprises:
    displaying, in a case where predetermined information is not received from an application program for generating image data, a first print setting screen including at least a first setting item; and
    displaying, in a case where the predetermined information is received from the application program, a second print setting screen including at least the first setting item and a second setting item, the second setting item being not included in the first print setting screen.

9. An information processing apparatus, comprises:
a display; and
a display controller,
wherein the display controller causes the display to display, in a case where predetermined information is not received from an application program for generating image data, a first print setting screen including at least a first setting item, and
wherein the display controller causes the display to display, in a case where the predetermined information is received from the application program, a second print setting screen including at least the first setting item and a second setting item, the second setting item being not included in the first print setting screen.

* * * * *